United States Patent [19]

Hirota et al.

[11] Patent Number: 4,607,285
[45] Date of Patent: Aug. 19, 1986

[54] NOISE REDUCING SYSTEM FOR VIDEO SIGNAL

[75] Inventors: Akira Hirota, Chigasaki; Shinji Hirano, Tokyo; Hiroyuki Kitamura, Hiratsuka; Takuya Tsushima, Ayase, all of Japan

[73] Assignee: Victor Company of Japan, Ltd., Yokohama, Japan

[21] Appl. No.: 576,155

[22] Filed: Feb. 2, 1984

[30] Foreign Application Priority Data

Feb. 7, 1983 [JP] Japan .................................. 58-18567

[51] Int. Cl.[4] .......................................... H04N 5/213
[52] U.S. Cl. ..................... 358/167; 358/36; 358/340
[58] Field of Search ............. 358/167, 166, 36, 327, 358/330, 340, 162

[56] References Cited

U.S. PATENT DOCUMENTS

| 4,007,483 | 2/1977 | Pham van Cang | 358/330 X |
| 4,142,211 | 2/1979 | Faroudja | 358/36 X |
| 4,200,889 | 4/1980 | Strobele | 358/167 |
| 4,316,210 | 2/1982 | Wharton | 358/166 X |
| 4,348,692 | 9/1982 | Ilmer | 358/167 X |
| 4,559,567 | 12/1985 | Maruichi et al. | 358/340 X |

FOREIGN PATENT DOCUMENTS 2917022 11/1979 Fed. Rep. of Germany .

OTHER PUBLICATIONS

"FKTG Tagungsband", manuscripts of lectures held during the 9th Annual Meeting of FKTG of Sep. 21 to 24, 1981 in Ulm, pp. 429 to 457.
"Frequenz 37", 1983, H. 11/12, pp. 324 to 333.

Primary Examiner—James J. Groody
Assistant Examiner—E. Anne Toth
Attorney, Agent, or Firm—Louis Bernat

[57] ABSTRACT

A noise reducing system for a video signal comprises a vertical pre-emphasis circuit supplied with an input video signal which is to be transmitted, for supplying an output signal to a transmission system, and a vertical de-emphasis circuit supplied with the video signal which has been pre-emphasized in the vertical pre-emphasis circuit and has been transmitted through the transmission system. The vertical pre-emphasis circuit has a characteristic for relatively emphasizing the level of high-frequency components of the input video signal having spatial frequencies in a vertical direction of a picture, compared to low-frequency components of the input video signal. On the other hand, the vertical de-emphasis circuit has a characteristic for relatively attenuating the level of the high-frequency components of the pre-emphasized video signal having spatial frequencies in the vertical direction of the picture, compared to the low-frequency components of the pre-emphasized video signal. The characteristics of the vertical pre-emphasis circuit and the vertical de-emphasis circuit cooperate so as to reduce noise having high spatial frequencies in the vertical direction of the picture.

9 Claims, 24 Drawing Figures

NOISE REDUCING SYSTEM FOR VIDEO SIGNAL

BACKGROUND OF THE INVENTION

The present invention generally relates to noise reducing systems for video signals, and more particularly to a noise reducing system for reducing noise in a video signal which is recorded onto a magnetic recording medium and reproduced from the magnetic recording medium, by subjecting the recording video signal to a pre-emphasis with respect to the vertical direction of a picture in a recording system at the time of the recording and by subjecting the reproduced video signal to a de-emphasis with respect to the vertical direction of the picture in a reproducing system at the time of the reproduction.

Conventionally, pre-emphasis and de-emphasis circuits are known for reducing noise in a video signal which is recorded and reproduced. In a recording system, the recording video signal is subjected to a pre-emphasis in the pre-emphasis circuit, and the reproduced video signal is subjected to a de-emphasis in the de-emphasis circuit within a reproducing system. In the case of a frequency modulated video signal, the signal-to-noise ratio becomes poorer for high-frequency components of the frequency modulated video signal. However, the pre-emphasis circuit can emphasize the high-frequency components of the video signal before the recording. At the time of the reproduction, the high-frequency components of the reproduced video signal are de-emphasized back to their original levels. Therefore, it is possible to record and reproduce the high-frequency components of the video signal with a satisfactory S/N ratio by use of such pre-emphasis and de-emphasis circuits.

A conventional pre-emphasis circuit employed a highpass filter or a transversal filter comprising a capacitor (C) and a resistor (R). A conventional de-emphasis circuit employed a lowpass filter or a transversal filter comprising a capacitor (C) and a resistor (R). Both the pre-emphasis and de-emphasis circuits were designed to add, to an information which is related to a signal obtained at the present point in time, a weighed information which is related to a signal obtained at a past point in time which is extremely close to the present. This weighted information is obtained by subjecting the information which is related to the signal obtained at the past point in time which is extremely close to the present, to a predetermined weighting.

However, as will be described later on in the specification in conjunction with the drawings, the conventional emphasis circuits were designed to carry out the pre-emphasis or the de-emphasis, by subtracting from or adding to an information related to a predetermined point in a reproduced picture, information related to a plurality of points which are positionally lagging (to the left of the predetermined point in the reproduced picture) or advanced (to the right of the predetermined point in the reproduced picture) with respect to the predetermined point on a horizontal scanning line which includes the predetermined point. According to such emphasis circuits, the high-frequency noise in the horizontal direction will be averaged, and the S/N ratio of the video signal will be improved. In the present specification, the emphasis carried out in the conventional emphasis circuits, will be referred to as horizontal emphasis.

Because the conventional emphasis circuit only carries out the horizontal emphasis described above, the noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction is high. On the other hand, in a case where the noise is in the form of a horizontal line which has a short width in the vertical direction of the picture and is long in the horizontal direction of the picture, the frequency of the noise in the horizontal direction is low. For this reason, the noise reducing effect was very poor in this case, and the conventional emphasis circuit suffered a disadvantage in that such a noise in the form of a horizontal line could hardly be reduced. In the present specification, the above noise in the form of a horizontal line which has a low frequency in the horizontal direction of the picture and has a high frequency in the vertical direction of the picture, will be referred to as a horizontal line noise. In actual practice, the horizontal line noise, is easily generated in the reproduced picture. Hence, there was a demand for a system which could effectively reduce such a horizontal line noise.

When a pre-emphasis is carried out in the pre-emphasis circuit, an overshoot and an undershoot occurs at the leading and trailing edges of the output pre-emphasized signal. When this pre-emphasized signal is frequency-modulated in a frequency modulator, the instantaneous frequency of the frequency modulated signal which is produced from the frequency modulator becomes extremely high at the leading edge of the pre-emphasized signal, where the overshoot occurs and the level rises to white level from black level. Thus, when the above frequency modulated signal is recorded onto and reproduced from a magnetic tape, the level of the frequency modulated signal may exceed a slicing range of a limiter which is located in a stage prior to a frequency modulator, in a case where the overshoot exceeds a predetermined level. When the level of the frequency modulated signal exceeds the slicing range of the limiter, a signal dropout will occur in the output of the limiter, and this signal dropout will be frequency-demodulated as a low-frequency signal in the frequency demodulator. As a result, the level of the frequency demodulated signal will drop to the black level, and the so called color inversion phenomenon is introduced.

Accordingly, a clipping circuit which clips the emphasized signal so that the level at the tip of the overshoot does not exceed a predetermined level, was generally provided in a stage prior to the frequency modulator. However, as the degree of emphasis was increased in order to obtain a larger emphasis effect, the overshoots and undershoots in the emphasized signal became greater. In this case, the degree of clipping became greater so as to properly clip the greater overshoots and undershoots, and as a result, the picture quality became poor at the leading and trailing edges of the emphasized signal. For this reason, it was undesirable to excessively increase the degree of emphasis for the purpose of reducing the horizontal line noise.

SUMMARY OF THE INVENTION

Accordingly, it is a general object of the present invention to provide a novel and useful noise reducing system for a video signal, in which the above described disadvantages have been eliminated.

Another and more specific object of the present invention is to provide a noise reducing system for a video signal, in which a pre-emphasis circuit has a characteristic for relatively emphasizing the level of high-frequency components having the spatial frequencies in the vertical direction as compared to the low-frequency components, and a de-emphasis circuit has a characteristic for relatively de-emphasizing the high-frequency components having the spatial frequencies in the vertical direction as compared to the low-frequency components, so as to carry out the emphasis with respect to the vertical direction of the picture. The characteristic of the de-emphasis circuit is complementary to the spatial frequency in the vertical direction versus level characteristic of the pre-emphasis circuit. In the present specification, the above emphasis will be referred to as a vertical emphasis as opposed to the horizontal emphasis described before. According to the system of the present invention, the noise within the video signal can be reduced even with respect to the low spatial frequencies in the horizontal direction. Thus, it is possible to effectively reduce the horizontal line noise, for example. In addition, the degree of clipping in the clipping circuit which is located in the stage prior to the frequency modulator described before, need not be large. Consequently, the deterioration in the picture quality which is introduced at the leading and trailing edges of the emphasized signal, can be reduced compared to the conventional system described before.

Other objects and further features of the present invention will be apparent from the following detailed description when read in conjunction with the accompanying drawings.

DETAILED DESCRIPTION

Figure 1A:
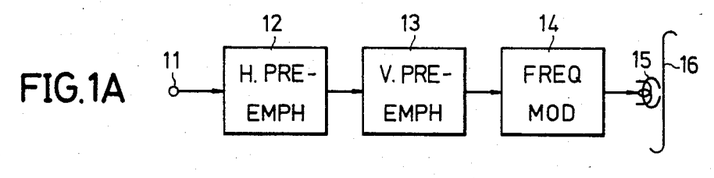
FIGS. 1A and 1B are systematic block diagrams respectively showing a video signal recording system and a video signal reproducing system which are applied with a noise reducing system according to the present invention.
Figure 1B:
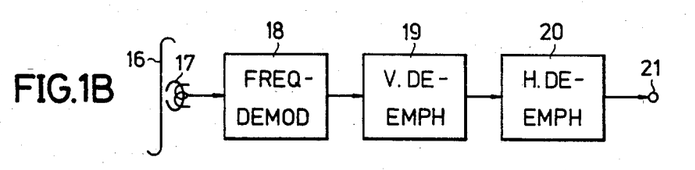
Figure 2A:
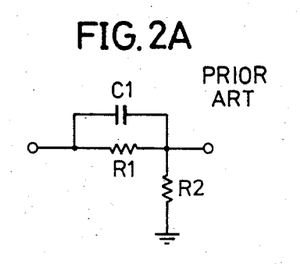
FIGS. 2A and 2B are circuit diagrams respectively showing an example of a conventional pre-emphasis circuit and an example of a de-emphasis circuit.

A video signal recording system and a video signal reproducing system which are applied with a noise reducing system according to the present invention, are respectively shown in FIGS. 1A and 1B. A video signal which is to be recorded, is supplied to a horizontal pre-emphasis circuit 12 shown in FIG. 1A, through an input terminal 11. The video signal is pre-emphasized in the horizontal pre-emphasis circuit 12, with respect to the horizontal direction of a picture. A known pre-emphasis circuit having a capacitor C1 and resistors R1 and R2 as shown in FIG. 2A, for example, may be used for the horizontal pre-emphasis circuit 12. The pre-emphasis circuit shown in FIG. 2A has a frequency response characteristic shown in FIG. 3A, and this circuit pre-emphasizes the signal components in the high frequency range as compared to the signal components in the low frequency range.

An output signal of the horizontal pre-emphasis circuit 12 is supplied to a vertical pre-emphasis circuit 13 of the present invention which will be described later on in the specification. An output signal of the vertical pre-emphasis circuit 13 is supplied to a frequency modulator 14, and a frequency modulated signal from the frequency modulator 14 is recorded onto a magnetic tape 16 by a recording magnetic head 15.

The recorded signal on the magnetic tape 16, is reproduced by a reproducing magnetic head 17 shown in FIG. 1B. The reproduced signal is supplied to a frequency demodulator 18 wherein the reproduced signal is frequency-demodulated. The demodulated signal is supplied to a vertical de-emphasis circuit 19 of the present invention which carries out a de-emphasis with respect to the vertical direction of the picture. The vertical de-emphasis circuit 19 has a frequency response characteristic which is complementary to the frequency response characteristic of the vertical pre-emphasis circuit 13. An output signal of the vertical de-emphasis circuit 19 is supplied to a horizontal de-emphasis circuit 20 which carries out a de-emphasis with respect to the horizontal direction of the picture. The horizontal de-emphasis circuit 20 has a frequency response characteristic which is complementary to the frequency response characteristic of the horizontal pre-emphasis circuit 12. As a result, a reproduced video signal which has been subjected to emphasis in the horizontal and vertical directions of the picture and has been reduced of the noise in the horizontal and vertical directions on the picture, is produced through an output terminal 21. This reproduced video signal has a high S/N ratio, and is supplied to a television receiver through a predetermined signal processing circuit.

In FIG. 1A, the vertical pre-emphasis circuit 13 may be coupled in a stage prior to the horizontal pre-emphasis circuit 12. Similarly, the vertical de-emphasis circuit 19 shown in FIG. 1B may be coupled in a stage subsequent to the horizontal de-emphasis circuit 20. Further, in the system according to the present invention, the horizontal pre-emphasis circuit 12 shown in FIG. 1A and the horizontal de-emphasis circuit 20 shown in FIG. 1B are not essential to the system, and these circuits 12 and 20 may be omitted.

Figure 2B:
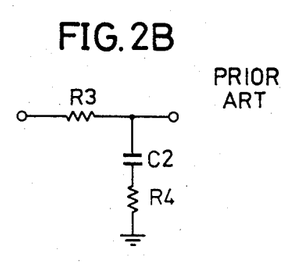
Figure 3A:
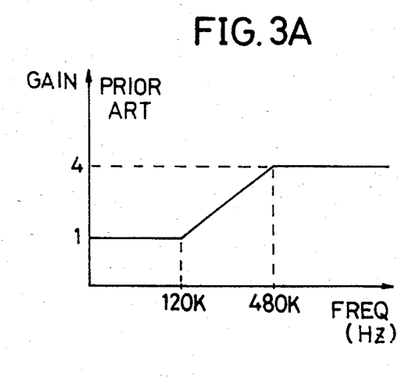
FIGS. 3A and 3B are graphs respectively showing frequency response characteristics of the circuits shown in FIGS. 2A and 2B.
Figure 3B:
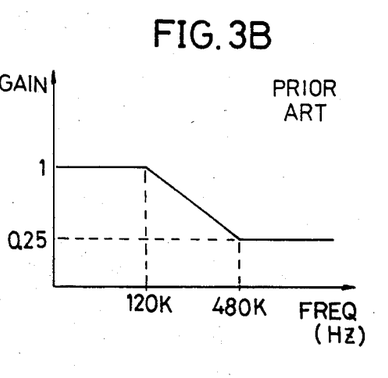

A known de-emphasis circuit having a capacitor C2 and resistors R3 and R4 as shown in FIG. 2B, for example, may be used for the horizontal de-emphasis circuit 20. The de-emphasis circuit shown in FIG. 2B has a frequency response characteristic shown in FIG. 3B, and this circuit de-emphasizes the signal components in the high frequency range as compared to the signal components in the low frequency range by suppressing the signal components in the high frequency range. In FIGS. 3A and 3B, the slopes of the characteristic between frequencies $f_1$ and $f_2$ are respectively 6 dB/oct and $-6$ dB/oct.

Instead of the capacitor-resistor (CR) circuits shown in FIGS. 2A and 2B, a forward type transversal filter and a backward type transversal filter proposed in a U.S. patent application Ser. No. 534,638 filed Sept. 22, 1983 entitled "VIDEO SIGNAL PROCESSING SYSTEM" in which the assignee is the same as the assignee of the present application, may be used for the horizontal pre-emphasis circuit 12 and the horizontal de-emphasis circuit 20.

Figure 4:
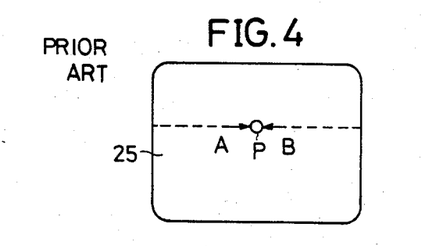
FIG. 4 is an illustration showing a picture for explaining the emphasis effect obtained in the conventional system.

When the CR circuits shown in FIGS. 2A and 2B or the forward type transversal filter is used for the conventional horizontal pre-emphasis circuit 12 and the horizontal de-emphasis circuit 20, the noise is averaged and reduced in the emphasized signal. In other words, by subtracting from or adding to an original signal related to a predetermined point P in a reproduced picture 25, signals related to a plurality of points which are positionally lagging (to the left of the predetermined point P in the reproduced picture) with respect to the predetermined point P on a horizontal scanning line which includes the predetermined point P, the noise is averaged and reduced. On the other hand when the backward type transversal filter is used for the conventional horizontal pre-emphasis circuit 12 and the horizontal de-emphasis circuit 20, the noise is averaged and reduced by subtracting from or adding to the original signal related to the predetermined point P in the reproduced picture 25, signals related to a plurality of points which are positionally advanced (to the right of the predetermined point P in the reproduced picture) with respect to the predetermined point P on the horizontal scanning line which includes the predetermined point P.

Thus, the horizontal pre-emphasis circuit 12 and the horizontal de-emphasis circuit 20 merely carry out horizontal emphasis. The noise can be reduced satisfactorily in a case where the noise is in the form of a vertical line which is long in the vertical direction of the picture and has a short width in the horizontal direction of the picture, for example. The noise can be reduced satisfactorily in this case, since the frequency of the noise in the horizontal direction of the picture is high. On the other hand, in a case of a horizontal line noise which has a short width in the vertical direction of the picture and is long in the horizontal direction of the picture, the frequency of the noise in the horizontal direction of the picture is low. For this reason, the noise reducing effect is very poor with respect to the horizontal line noise, and the horizontal line noise can hardly be reduced.

Accordingly, the system of the present invention is designed to reduce the above horizontal line noise which cannot be reduced in the conventional emphasis circuits. Description will hereinafter be given with respect to the vertical pre-emphasis circuit 13 and the vertical de-emphasis circuit 19.

Figure 5:
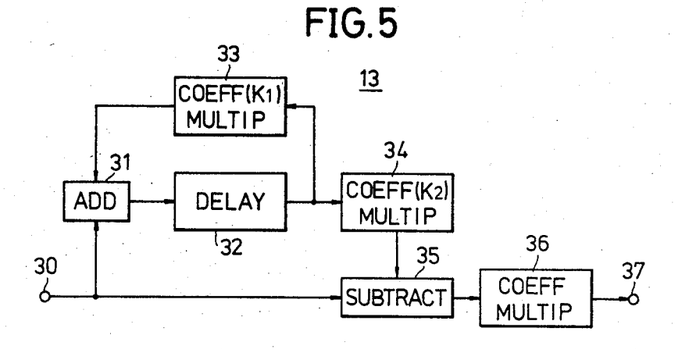
FIG. 5 is a systematic block diagram showing a first embodiment of a vertical pre-emphasis circuit which is employed in the system according to the present invention.

An embodiment of the vertical pre-emphasis circuit 13 is shown in FIG. 5. The output video signal of the horizontal pre-emphasis circuit 12 shown in FIG. 1A, is supplied to an adding circuit 31 and to a subtracting circuit 35, through an input terminal 30. The signal which has passed through the adding circuit 31, is supplied to a delay circuit 32 wherein the signal is delayed by a predetermined delay time. The delay time of the delay circuit 32 is set approximately equal to one horizontal scanning period (that is, 63.5 $\mu$sec and hereinafter simply referred to as 1H). The signal which is delayed by 1H in the delay circuit 32, is supplied to a coefficient multiplying circuit (attenuating circuit) 33 which multiplies a coefficient $K_1$ ($K_1$ is less than 1) to the signal, and to a coefficient multiplying circuit (attenuating circuit) 34 which multiplies a coefficient $K_2$ ($K_2$ is less than 1) to the signal. The delayed output signal of the delay circuit 32, which is multiplied with the coefficient $K_1$ in the coefficient multiplying circuit 33, is added with the signal from the input terminal 30 in the adding circuit 31. The output signal of the adder 31 is supplied again to the delay circuit 32 and delayed by 1H. Hence, an operation in which the output signal of the delay circuit 32 is multiplied with the coefficient $K_1$ in the coefficient multiplying circuit 33 and then supplied again to the delay circuit 32, is repeated. On the other hand, the delayed output signal of the delay circuit 32, which is multiplied with the coefficient $K_2$ in coefficient multiplying circuit 34, is subjected to a subtraction between the signal from the input terminal 30 in the subtracting circuit 35. The output signal of the subtracting circuit 35 is passed through a coefficient multiplying circuit 36 which multiplies a coefficient $K_3$ and adjusts the D.C. gain to unity (1), and is obtained as a vertical pre-emphasized signal through an output terminal 37.

If the delay time of the delay circuit 32 is represented by $\tau$, the output video signal which is obtained through the output terminal 37 is a signal from which signals existing $\tau, 2\tau, 3\tau, \ldots, n\tau$ (n is an integer) in the past with respect to the input video signal from the input terminal 30 have been subtracted. In other words, when the delay time $\tau$ is set to 1H as described before, the output video signal is a signal from which signals (at black points in FIG. 9) in the vertical direction existing 1H, 2H, . . . , nH prior to the signal at the point P within the reproduced picture 25 shown in FIG. 9 have been subtracted. The vertical pre-emphasis circuit shown in FIG. 5 has a characteristic for emphasizing the high-frequency components having the spatial frequencies in the vertical direction of the picture, as compared to the low-frequency components.

Figure 6:
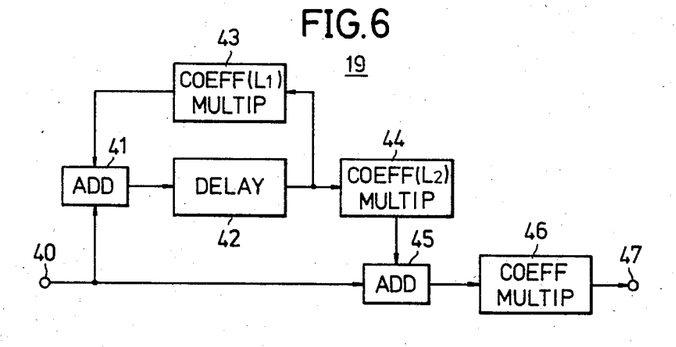
FIG. 6 is a systematic block diagram showing a first embodiment of a vertical de-emphasis circuit which is employed in the system according to the present invention.

An embodiment of the vertical de-emphasis circuit 19 is shown in FIG. 6. The output video signal of the frequency demodulator 18 shown in FIG. 1A, is supplied to adding circuits 41 and 45, through an input terminal 40. The signal which has passed through the adding circuit 41, is supplied to a delay circuit 42 wherein the signal is delayed by a predetermined delay time. The delay time of the delay circuit 42 is set approximately equal to 1H (that is, 63.5 $\mu$sec). The signal which is delayed by 1H in the delay circuit 42, is supplied to a coefficient multiplying circuit (attenuating circuit) 43 which multiplies a coefficient $L_1$ ($L_1$ is less than 1) to the signal, and to a coefficient multiplying circuit (attenuating circuit) 44 which multiplies a coefficient $L_2$ ($L_2$ is less than 1) to the signal. The delayed output signal of the delay circuit 42, which is multiplied with the coefficient $L_1$ in the coefficient multiplying circuit 43, is added with the signal from the input terminal 40 in the adding circuit 41. The output signal of the adder 41 is supplied again to the delay circuit 42 and delayed by 1H. Hence, an operation in which the output signal of the delay circuit 42 is multiplied with the coefficient $L_1$ in the coefficient multiplying circuit 43 and then supplied again to the delay circuit 42, is repeated. On the other hand, the delayed output signal of the delay circuit 42, which is multiplied with the coefficient $L_2$ in coefficient multiplying circuit 44, is added with the signal from the input terminal 40 in the adding circuit 45. The output signal of the adding circuit 45 is passed through a coefficient multiplying circuit 46 which multiplies a coefficient $L_3$ and adjusts the D.C. gain to unity, and is obtained as a vertical de-emphasized signal through an output terminal 47.

If the delay time of the delay circuit 42 is represented by $\tau$ (same as the delay time $\tau$ of the delay circuit through the output terminal 47 is a signal which is added with signals existing $\tau$, $2\tau$, $3\tau$, . . . , $n\tau$ (n is an integer) in the future with respect to the input frequency demodulated video signal. In other words, the vertical de-emphasis circuit 19 shown in FIG. 6 has a characteristic for attenuating the high-frequency components having the spatial frequencies in the vertical direction of the picture, as compared to the low-frequency components. The spatial frequency in the vertical direction versus level characteristic of the vertical de-emphasis circuit 19, is complementary to the spatial frequency in the vertical direction versus level characteristic of the vertical pre-emphasis circuit 13 shown in FIG. 5.

Figure 7:
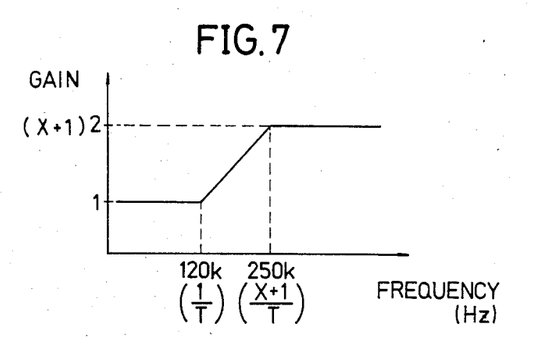
FIG. 7 is a graph showing the frequency response characteristic of the vertical pre-emphasis circuit shown in FIG. 5.
Figure 8:
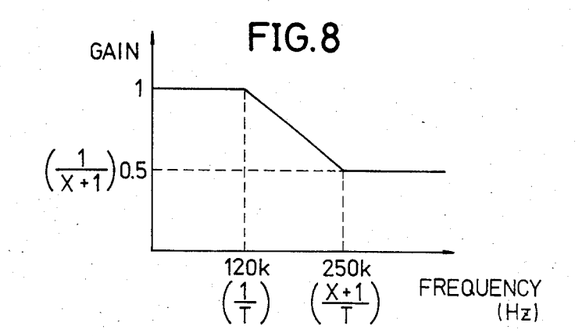
FIG. 8 is a graph showing the frequency response characteristic of the vertical de-emphasis circuit shown in FIG. 6.

For example, when the delay times $\tau$ of the delay circuits 32 and 42 are respectively equal to 1H and the coefficients $K_1$ and $K_2$ are respectively set to 0.76 and 0.12, the coefficients $L_1$ and $L_2$ are respectively set to 0.87 and 0.13. In this case, the vertical pre-emphasis circuit shown in FIG. 5 has a frequency response characteristic shown in FIG. 7 when the characteristic is converted into equivalent terms in the horizontal direction. As shown in FIG. 7, the level of high-frequency components which exist in the frequencies over 250 kHz, is emphasized by approximately twice the low-frequency components which exist in the frequencies under 120 kHz. The vertical de-emphasis circuit shown in FIG. 6 has a frequency response characteristic shown in FIG. 8 when the characteristic is converted into equivalent terms in the horizontal direction. As shown in FIG. 8, the level of the high-frequency components which exist in the frequencies over 250 kHz, is attenuated by approximately $\frac{1}{2}$ the low-frequency components which exist in the frequencies under 120 kHz.

Description will now be given with respect to calculations of the numerical values described above. It will be assumed that X represents the emphasis quantity (X = 1 in the present embodiment), T represents the time constant (T = 1.3 $\mu$sec in the present embodiment), and $\Delta t$ represents the delay time which is the interval of the horizontal scanning lines and has been converted into equivalent terms in the horizontal direction (that is, $\Delta t$ = 180 nsec). In this case, the coefficients $K_1$ and $K_2$ in the coefficient multiplying circuits 33 and 34 may be calculated from the following equations.

$$K_1 = e^{-(1+X)\Delta t/T} = e^{-(1+1)180nsec/1.3\mu sec} \approx 0.76$$

$$K_2 = (1-K_1)X/(X+1) \approx 0.12$$

Further, the coefficient $K_3$ of the coefficient multiplying circuit 36 can be calculated from the following equation.

$$K_3 = X + 1 = 2$$

On the other hand, the coefficients $L_1$ and $L_2$ of the coefficient multiplying circuits 43 and 44 may be calculated from the following equations.

$$L_1 = e^{-\Delta t/T} = e^{-180nsec/1.3\mu sec} \approx 0.87$$

$$L_2 = (1-L_1)X \approx 0.13$$

Moreover, the coefficient $L_3$ of the coefficient multiplying circuit 46 may be calculated from the following equation.

$$L_3 = 1/(X+1) = 0.5$$

Figure 9:
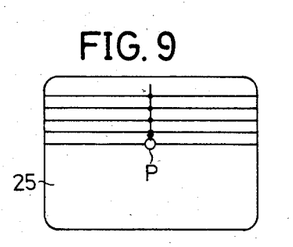
FIG. 9 is an illustration showing a picture for explaining the emphasis effect obtained in the system of the present invention.

When the delay times $\tau$ of the delay circuits 32 and 42 are respectively set to 1H, the signal at the point P in the reproduced picture 25 shown in FIG. 9 is subjected to the pre-emphasis and de-emphasis in which subtraction or addition is carried out between the signal at the point P the signals indicated by the black points existing 1H, 2H, . . . , nH prior to the signal at the point P. That is, the signal at the point P is subjected to subtraction or addition between the signals existing on horizontal scanning lines which are 1H, 2H, . . . , nH prior to the horizontal scanning line on which the signal at the point P exists.

According to the system of the present invention, the noise is averaged in the vertical direction of the picture. Thus, noise such as the horizontal line noise which has a low frequency in the horizontal direction (length is long in the horizontal direction) and a high frequency in the vertical direction (width is short in the vertical direction), can be effectively reduced by the system according to the present invention. Accordingly, with respect to the horizontal direction, the low-frequency noise under the frequency $f_2$ shown in FIGS. 3A and 3B which could not be reduced in the conventional horizontal emphasis circuits, can be effectively eliminated by the system according to the present invention.

The delay times $\tau$ of the delay circuits 32 and 42 may respectively be set to a value which is slightly different from 1H. When the delay times $\tau$ are respectively set to a value which is slightly larger than 1H, the subtraction or addition is carried out between the signal at the point P in the reproduced picture 25 shown in FIG. 10 and the signals at points which are arranged on an imaginary line I which slopes upwardly to the left of the picture. The emphasis in this case will be referred to as an "upwardly left-sloping emphasis" in the present specification. This upwardly left-sloping emphasis effectively reduces the noise components which extend longer in a direction which is to the upward right of the picture.

Figure 10:
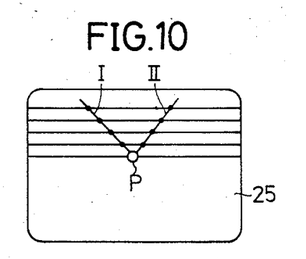
FIG. 10 is an illustration showing a picture for explaining the emphasis effect obtained in the system of present invention when a delay time in a delay circuit is set to a value which is slightly different from 1H, where H represents one horizontal scanning period.

On the other hand, when the delay times $\tau$ are respectively set to a value which is slightly smaller than 1H, the subtraction or addition is carried out between the signal at the point P and the signals at points which are arranged on an imaginary line II which slopes upwardly to the right of the picture. The emphasis in this case will be referred to as an "upwardly right-sloping emphasis" in the present specification. This upwardly right-sloping emphasis effectively reduces the noise components which extend longer in a direction which is to the upward left of the picture.

The time it takes to scan in the horizontal direction to cover a vertical distance (separation) between two adjacent horizontal scanning lines of the same video field in the picture, is 180 nsec. Thus, when the delay times $\tau$ are respectively set to a value which is larger or smaller than 1H (63.5 $\mu$sec) by the above time of 180 nsec, an upwardly left-sloping emphasis which is inclined by 45° to the vertical direction of the picture, or an upwardly right-sloping emphasis which is inclined by 45° to the vertical direction of the picture, is carried out.

In either case of the upwardly left-sloping emphasis or the upwardly right-sloping emphasis, it is not only possible to obtain a predetermined frequency response characteristic with respect to the horizontal direction, but it is also possible to obtain a predetermined frequency response characteristic with respect to the vertical direction. Consequently, compared to the case of the horizontal emphasis, the low-frequency noise can be reduced effectively.

Figure 11:
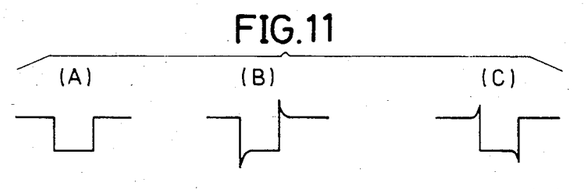
FIGS. 11(A) through 11(C) are graphs respectively showing waveforms of the original and pre-emphasized signals.

Generally, the vertical correlation in the video signal is high. If it is assumed that the original video signal has the waveform shown in FIG. 11(A) within 1H, the upwardly left-sloping pre-emphasis will result in a pre-emphasized video signal having a waveform shown in FIG. 11(B) in which the overshoots are pre-emphasized as in the case of the conventional pre-emphasis circuit. However, the level of the overshoots is suppressed to a low level compared to the conventional case where the horizontal pre-emphasis is carried out, because the vertical pre-emphasis is also carried out in the present invention. On the other hand, when the upwardly right-sloping pre-emphasis is carried out, pre-shoots will occur in the output video signal as shown in FIG. 11(C). Accordingly, the pre-shoots which are usually difficult to form, can easily be formed by the upwardly right-sloping pre-emphasis.

Figure 12:
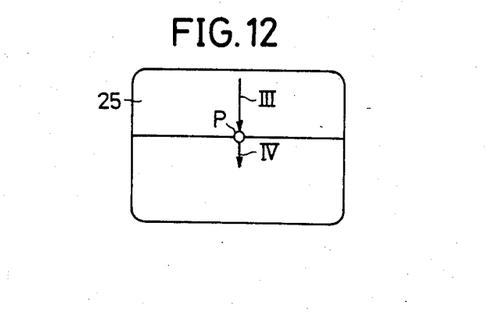
FIG. 12 is an illustration showing a picture for explaining a smear phenomenon.

When distortion occurs in the signal transmission system, overshoots and undershoots will be introduced at the leading and trailing edges of the signal when the pre-emphasis is carried out, as described before. These overshoots and undershoots at the leading and trailing edges of the pre-emphasized signal, cannot be eliminated by the de-emphasis. Thus, these overshoots and undershoots will introduce a smear phenomenon in the reproduced picture. The smear phenomenon which occurs as a result of the horizontal emphasis, appears as a horizontal streaking in the picture, but such horizontal streaking can be effectively reduced according to the present invention. However, when the vertical emphasis according to the present invention is carried out in a direction indicated by a line III in FIG. 12 with respect to the point P in the reproduced picture 25, a smear phenomenon may occur vertically from the point P as indicated by a line IV in FIG. 12.

Figure 13:
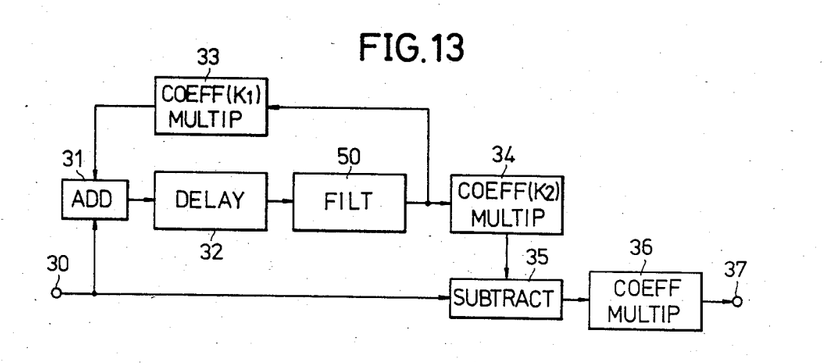
FIG. 13 is a systematic block diagram showing a second embodiment of a vertical pre-emphasis circuit.
Figure 14:
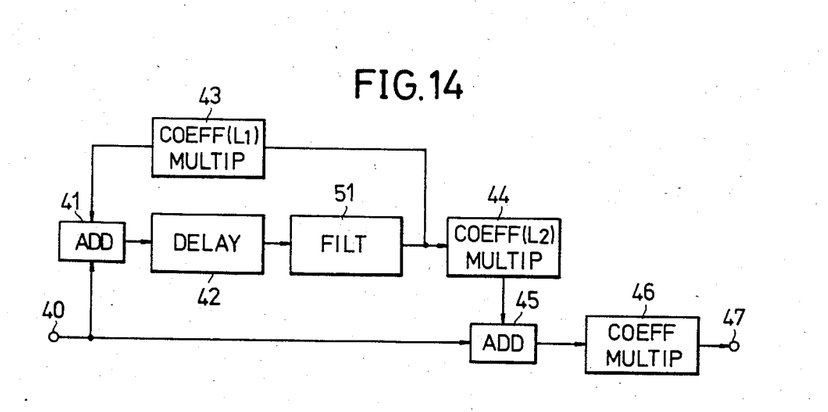
FIG. 14 is a systematic block diagram showing a second embodiment of a vertical de-emphasis circuit.

Accordingly, description will now be given with respect to embodiments in which the above smear phenomenon is made less conspicuous. A second embodiment of the vertical pre-emphasis circuit is shown in FIG. 13, and a second embodiment of the vertical de-emphasis circuit is shown in FIG. 14. In FIGS. 13 and 14, those parts which are the same as those corresponding parts in FIGS. 5 and 6 are designated by the same reference numerals, and their description will be omitted. The circuits shown in FIGS. 13 and 14 respectively differ from the circuits shown in FIGS. 5 and 6, in that filtering circuits 50 and 51 are respectively coupled to the delay circuits 32 and 42.

In FIG. 13, the delayed video signal from the delay circuit 32 is supplied to the filtering circuit 50. A filter comprising a CR circuit, or a transversal filter, may be used for the filtering circuit 50. The filtering circuit 50 has an attenuating characteristic for relatively attenuating the high-frequency components with respect to the low-frequency components. Hence, the filtering circuit 50 produces a delayed video signal having a waveform in which the high-frequency components of the delayed video signal supplied thereto has been attenuated. The filtering circuit 51 shown in FIG. 14 operates in the same manner as the filtering circuit 50.

According to the present embodiment, the waveform of the delayed video signal is rounded. As a result, with respect to a certain emphasis in the vertical direction of the picture, or in an oblique direction between vertical and horizontal directions, which is determined by the delay times of the delay circuits 32 and 42, emphasis in directions which are slightly different from the direction of the certain emphasis are added. In a case where the CR attenuating circuit shown in FIG. 2A is used for the filtering circuits 50 and 51, the delayed video signal is further subjected to a slight delay. Thus, in this case, with respect to the certain direction which is determined by the delay times of the delay circuits 32 and 42, the signal components are added in each of the directions which are different from the certain direction in only the left side of the point P in the picture. On the other hand, in a case where the transversal filter which has the attenuating characteristic for attenuating the high frequency range is used for the filtering circuits 50 and 51, it is possible to obtain signals which are slightly advanced and slightly lagging the delayed video signal from the delay circuits 32 and 42. Hence, in this case, with respect to the certain direction which is determined by the delay times of the delay circuits 32 and 42, the signal components are added in each of the directions which are different from the certain direction symmetrically on the right and left of the point P in the picture.

Figure 15:
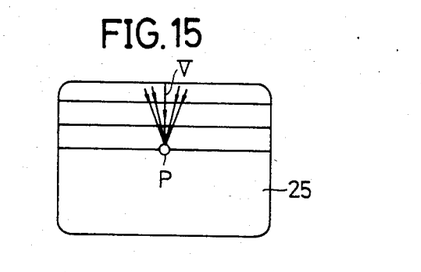
FIG. 15 is an illustration showing a picture for explaining the state of the reproduced picture when the emphasis shown in FIGS. 13 and 14.

Accordingly, when the delay times of the delay circuits 32 and 42 are respectively set to 1H and the transversal filter is used for the filtering circuits 50 and 51, the signals in the vertical direction V (certain direction described above) in the reproduced picture 25 shown in FIG. 15 are subtracted or added with respect to the signal at the point P. At the same time, the signals in directions which are slightly inclined from the vertical direction V are subtracted or added with respect to the signal at the point P. Therefore, the smear phenomenon which occurs in the lower part of the reproduced picture 25, is distributed in various directions and will not occur solely in one direction. As a result, the smear phenomenon will not be conspicuous to the human eye.

In FIGS. 13 and 14, the filtering circuits 50 and 51 may respectively be coupled in a stage prior to the delay circuits 32 and 42, instead of being coupled in a stage subsequent to the delay circuits 32 and 42. In other words, the filtering circuit 50 may be coupled between the adding circuit 31 and the delay circuit 32, and the filtering circuit 51 may be coupled between the adding circuit 41 and the delay circuit 42.

Figure 16:
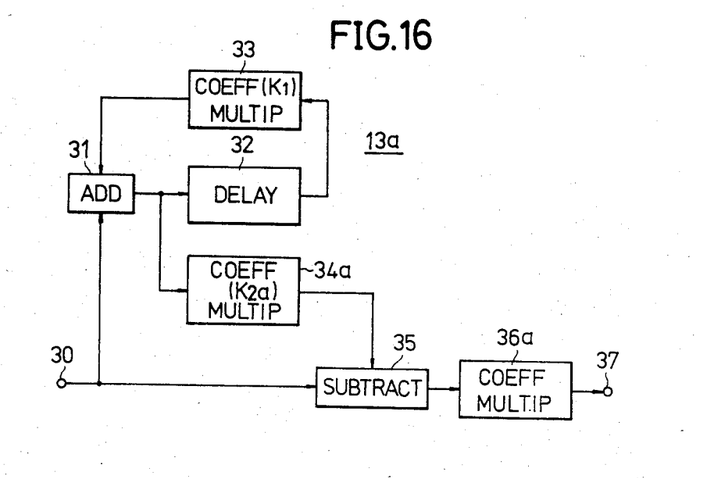
FIG. 16 is a systematic block diagram showing a third embodiment of a vertical pre-emphasis circuit.
Figure 17:
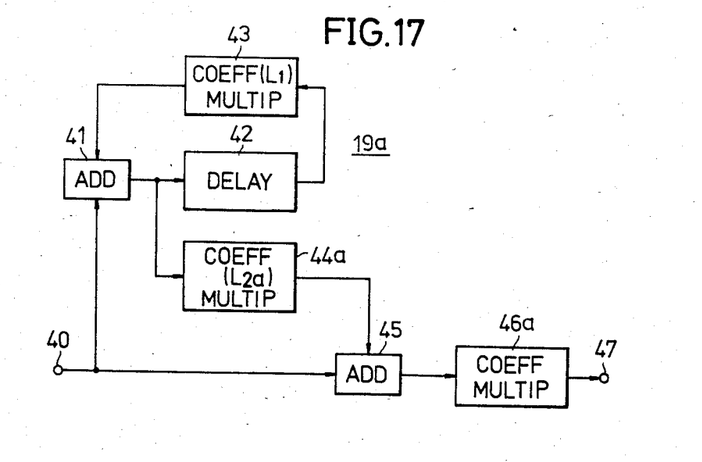
FIG. 17 is a systematic block diagram showing a third embodiment of a vertical de-emphasis circuit.

A vertical pre-emphasis circuit 13a shown in FIG. 16 employs a coefficient multiplying circuit 34a instead of the coefficient multiplying circuit 34. In FIG. 16, the output signal of the adding circuit 31 is supplied to the subtracting circuit 35 through the coefficient multiplying circuit 34a. Similarly, a vertical de-emphasis circuit 19a shown in FIG. 17 employs a coefficient multiplying circuit 44a instead of the coefficient multiplying circuit 44. In FIG. 17, the output signal of the adding circuit 41 is supplied to the adding circuit 45 through the coefficient multiplying circuit 44a. The effects which are obtained by the circuits shown in FIGS. 16 and 17, are the same as the effects obtained by the first embodiment described before in conjunction with FIGS. 5 and 6.

In FIG. 16, the coefficient $K_1$ of the coefficient multiplying circuit 33 is the same as the coefficient $K_1$ of the coefficient multiplying circuit 33 shown in FIG. 5. Coefficients $K_{2a}$ and $K_{3a}$ of the coefficient multiplying circuits 34a and 36a, may be calculated from the following equations.

$$K_{2a} = (1-K_1)X/(K_1+X) \approx 0.14$$

$$K_{3a} = 1 + X/K_1 \approx 2.3$$

In FIG. 17, the coefficient $L_1$ of the coefficient multiplying circuit 43 is the same as the coefficient $L_1$ of the coefficient multiplying circuit 43 shown in FIG. 6. Coefficients $L_{2a}$ and $L_{3a}$ of the coefficient multiplying circuits 44a and 46a may be calculated from the following equations.

$$L_{2a} = X(1-L_1)/[L_1(1+X)-1] \approx 0.17$$

$$L_{3a} = 1 - [X/(X+1)](1/L_1) \approx 0.43$$

Next, description will be given with respect to concrete circuits of the block systems shown in FIGS. 5, 6, 16, and 17, by referring to FIGS. 18 through 21.

Figure 18:
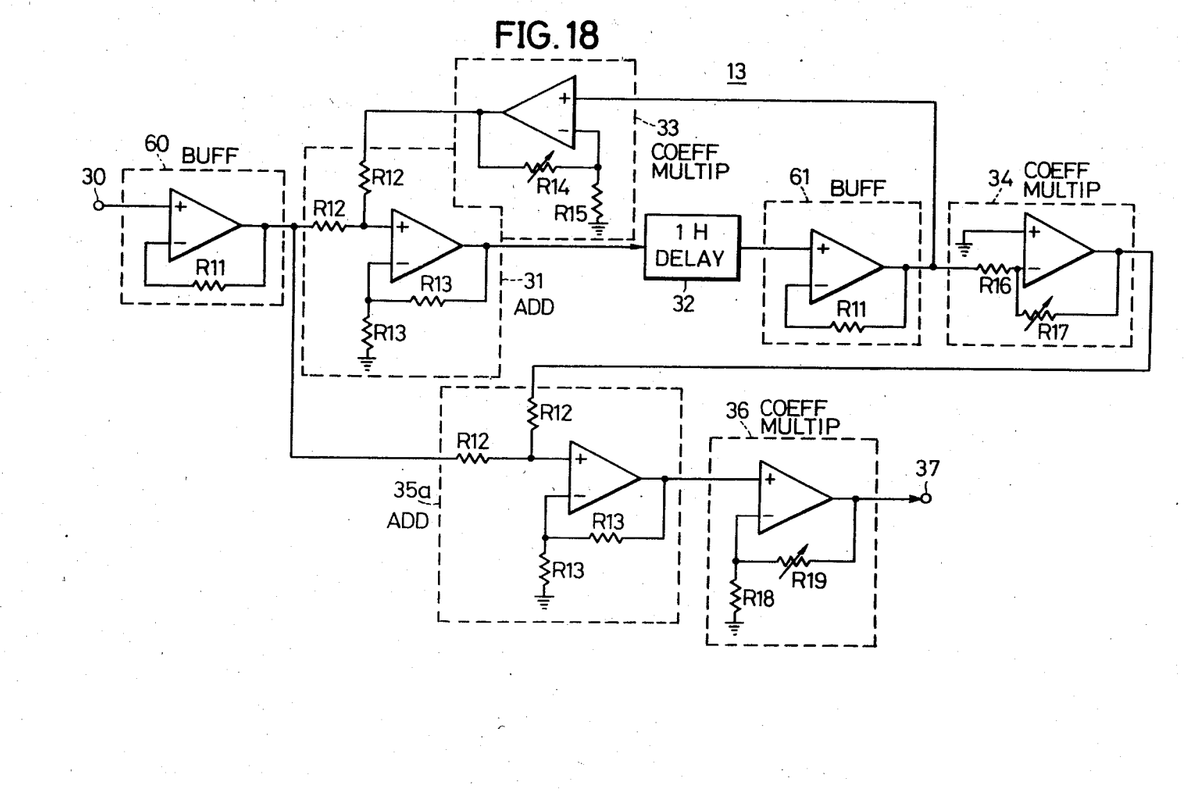
FIG. 18 is a circuit diagram showing an embodiment of a concrete circuit within the block system shown in FIG. 5.

FIG. 18 shows a concrete circuit corresponding to the vertical pre-emphasis circuit 13 shown in FIG. 5. In FIG. 18, the signal from the input terminal 30 is passed through a buffer circuit 60 which comprises an operational amplifier and a resistor R11. An output signal of this buffer circuit 60, is supplied to the adding circuit 31 and to an adding circuit 35a. The adding circuits 31 and 35a each comprise an operational amplifier and resistors R12 and R13. The signal from the coefficient multiplying circuit 33 which comprises an operational amplifier and resistors R14 and R15, and the input signal which is obtained through the buffer circuit 60, are added in the adding circuit 31. The output signal of the adding circuit 31 is delayed by 1H in the 1H delay circuit 32, and the delayed output signal of the delay circuit 32 is passed through a buffer circuit 61 which comprises an operational amplifier and a resistor R11. An output signal of this buffer circuit 61, is supplied to the coefficient multiplying circuits 33 and 34. The coefficient multiplying circuit 34 comprises an operational amplifier and resistors R16 and R17. In the coefficient multiplying circuit 33, the resistance of the variable resistor R14 is adjusted so that the following equation is satisfied.

$$(R14 + R15)/R15 = K_1 = 0.76$$

Further, in the coefficient multiplying circuit 34, the resistance of the variable resistor R17 is adjusted so that the following equation is satisfied.

$$R16/R17 = K_2 = 0.12$$

The signal supplied to the coefficient multiplying circuit 34, is multiplied with the coefficient $K_2$ and is inverted of its phase. The output signal of the coefficient multiplying circuit 34 is then supplied to the adding circuit 35a wherein the signal is added with the input signal which is obtained through the buffer circuit 60, and a substantial subtraction takes place in the adding circuit 35a. The output signal of the adding circuit 35a is passed through the coefficient multiplying circuit 36 which comprises an operational amplifier and resistors R18 and R19, and is produced through the output terminal 37. In the coefficient multiplying circuit 36, the resistance of the variable resistor R19 is adjusted so that the following equation is satisfied.

$$(R18 + R19)/R18 = K_3 = 0.5$$

The gains of the buffer circuits 60 and 61, are respectively equal to one.

Figure 19:
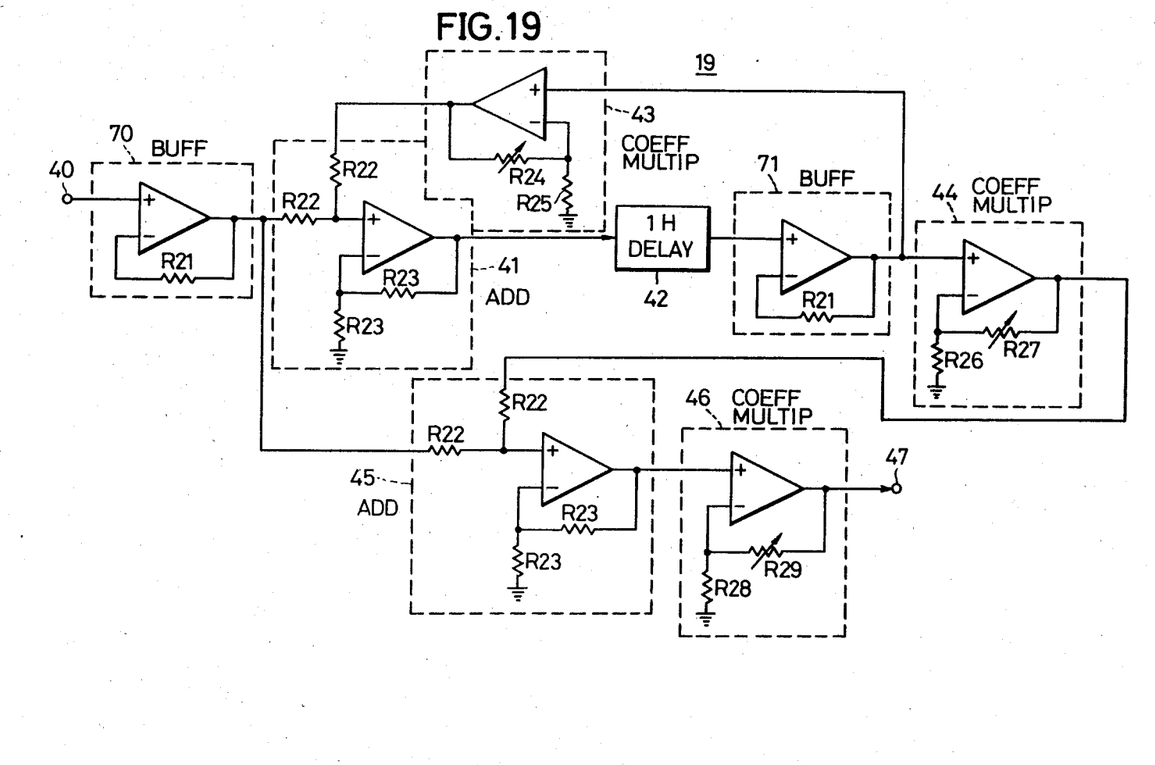
FIG. 19 is a circuit diagram showing an embodiment of a concrete circuit within the block system shown in FIG. 6.

FIG. 19 shows a concrete circuit corresponding to the vertical de-emphasis circuit 19 shown in FIG. 6. The construction of the circuit shown in FIG. 19 is the same as the construction of the circuit shown in FIG. 18, and detailed description of the circuit shown in FIG. 19 will be omitted. Buffer circuits 70 and 71 each comprise an operational amplifier and a resistor R21. The coefficient multiplying circuit 43 comprises an operational amplifier and resistors R24 and R25, and the resistance of the variable resistor R24 is adjusted so that the following equation is satisfied.

$$(R24 + R25)/R25 = L_1 = 0.87$$

The coefficient multiplying circuit 44 comprises an operational amplifier and resistors R26 and R27, and the resistance of the variable resistor R27 is adjusted so that the following equation is satisfied.

$$(R26 + R27)/R26 = L_2 = 0.13$$

Further, the coefficient multiplying circuit 46 comprises an operational amplifier and resistors R28 and R29, and the resistance of the variable resistor R29 is adjusted so that the following equation is satisfied.

$$(R28 + R29)/R28 = L_3 = 0.5$$

The phase of the signal is not inverted in the coefficient multiplying circuit 44, and for this reason, a substantial addition takes place between the two signals in the adding circuit 45.

Figure 20:
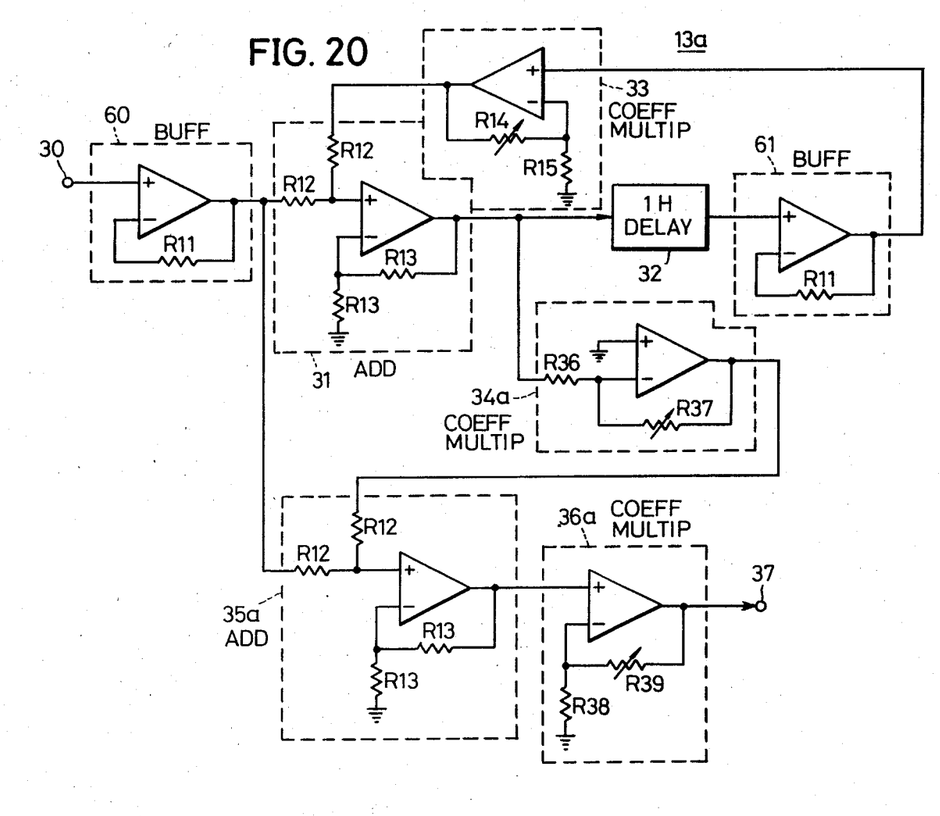
FIG. 20 is a circuit diagram showing an embodiment of a concrete circuit within the block system shown in FIG. 16.

FIG. 20 shows a concrete circuit corresponding to the vertical pre-emphasis circuit 13a shown in FIG. 16. In FIG. 20, those parts which are the same as those corresponding parts in FIG. 18 are designated by the same reference numerals, and their description will be omitted. In FIG. 20, the output signal of the adding circuit 31 is supplied to the 1H delay circuit 32 and to the coefficient multiplying circuit 34a which comprises an operational amplifier and resistors R36 and R37. The signal supplied to the coefficient multiplying circuit 34a is multiplied with the coefficient $K_{2a}$ and is inverted of its phase. The output signal of the coefficient multiplying circuit 34a is supplied to the adding circuit 35a wherein a substantial subtraction takes place between the signal from the coefficient multiplying circuit 35a and the signal from the buffer circuit 60. In the coefficient multiplying circuit 34a, the resistance of the variable resistor R37 is adjusted so that the following equation is satisfied.

$$R37/R36 = K_{2a} = 0.14$$

In the coefficient multiplying circuit 36a which comprises an operational amplifier and resistors R38 and R39, the resistance of the variable resistor R39 is adjusted so that the following equation is satisfied.

$$(R38 + R39)/R38 = K_{3a} = 2.3$$

Figure 21:
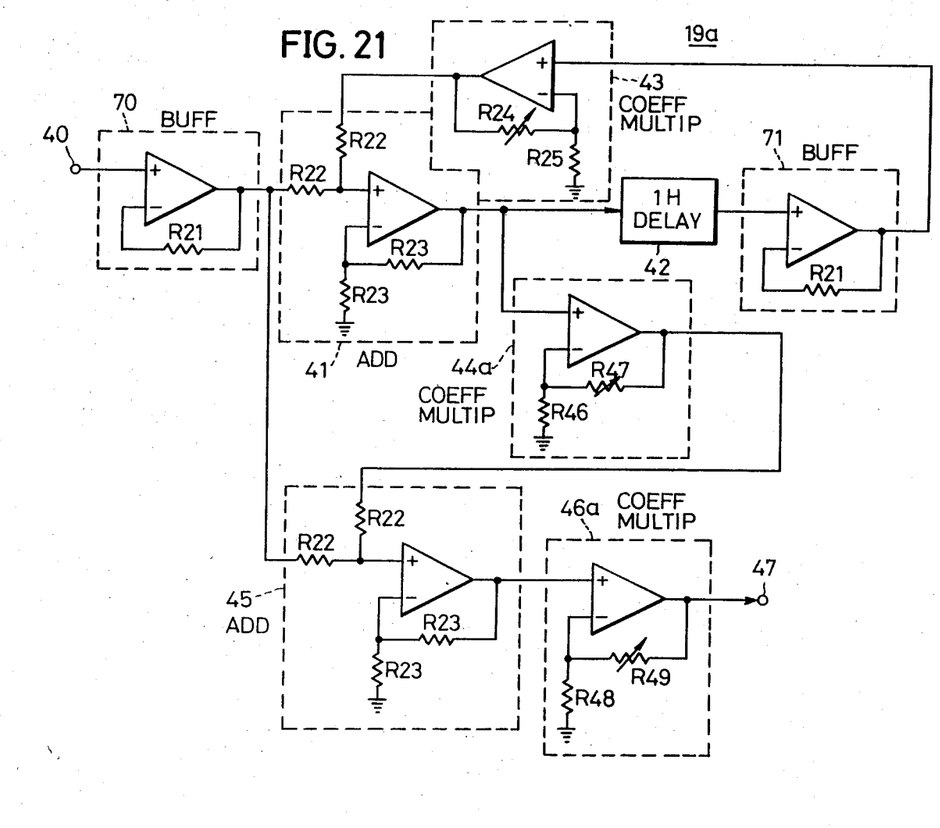
FIG. 21 is a circuit diagram showing an embodiment of a concrete circuit within the block system shown in FIG. 17.

FIG. 21 shows a concrete circuit corresponding to the vertical de-emphasis circuit 19a shown in FIG. 17. In FIG. 21, those parts which are the same as those corresponding parts in FIG. 19 are designated by the same reference numerals, and their description will be omitted. In FIG. 21, the output signal of the adding circuit 41 is supplied to the 1H delay circuit 42 and to the coefficient multiplying circuit 44a which comprises an operational amplifier and resistors R46 and R47. The signal supplied to the coefficient multiplying circuit 44a is multiplied with the coefficient $L_{2a}$ and is supplied to the adding circuit 45 without being inverted of its phase. Thus, a substantial addition takes place in the adding circuit 45, between the signal from the coefficient multiplying circuit 44a and the signal from the buffer circuit 60. In the coefficient multiplying circuit 44a, the resistance of the variable resistor R47 is adjusted so that the following equation is satisfied.

$$(R46 + R47)/R46 = L_{2a} = 0.17$$

In the coefficient multiplying circuit 46a which comprises an operational amplifier and resistors R48 and R49, the resistance of the variable resistor R49 is adjusted so that the following equation is satisfied.

$$(R48 + R49)/R48 = L_{3a} = 0.43$$

Further, the present invention is not limited to these embodiments, but various variations and modifications may be made without departing from the scope of the present invention.

What is claimed is:

1. A noise reducing system for a video signal, said noise reducing system comprising:

vertical pre-emphasis means supplied with an input video signal which is to be transmitted, for supplying an output signal to a transmission system, said vertical pre-emphasis means having a characteristic for relatively emphasizing the level of high-frequency components of the input video signal having spatial frequencies, the emphasizing being in a vertical direction of a picture compared to low-frequency components of the input video signal, said vertical pre-emphasis means comprising a first loop circuit supplied with said input video signal for repeatedly circulating the input video signal, the input video signal being subject to a predetermined delay time and to a first loop gain per one cycle, and subtracting means for subtracting substantially a video signal derived from the first loop circuit and multiplied by a first coefficient from said input video signal to get the output signal of the vertical pre-emphasis means; and vertical de-emphasis means supplied with the video signal which has been pre-emphasized in said vertical pre-emphasis means and which has been transmitted through the transmission system, said vertical de-emphasis means having a characteristic for relatively attenuating the level of the high-frequency components of the pre-emphasized video signal having spatial frequencies in the vertical direction of the picture as compared to the low-frequency components of the pre-emphasized video signal, said vertical de-emphasis means comprising a second loop circuit supplied with the video signal obtained through the transmission system for repeatedly circulating the obtained video signal, the obtained video signal being subject to the same predetermined delay time of said first loop circuit and to a second loop gain per one cycle, and adding means for adding a video signal derived from the second loop circuit and multiplied by a second coefficient to the obtained video signal to get the output signal of the vertical de-emphasis means, the characteristics of said vertical pre-emphasis means and said vertical de-emphasis means cooperating so as to reduce noise having high spatial frequencies in the vertical direction of the picture.

2. A noise reducing system as claimed in claim 1 in which said first loop circuit comprises a first adding circuit supplied with said input video signal, a first delay circuit having the predetermined delay time and a first coefficient multiplying circuit for multiplying a signal applied thereto by a first coefficient which is equal to the first loop gain of the first loop circuit, the first adding circuit, the first delay circuit and the first coefficient multiplying circuit being connected in a loop circuit, and the second loop circuit comprises a second adding circuit supplied with said obtained video signal, a second delay circuit having the predetermined delay time and second coefficient multiplying circuit for multiplying a signal applied thereto by a second coefficient which is equal to the second loop gain of the second loop circuit, the second adding circuit, the second delaying circuit and the second coefficient multiplying circuit being connected in a loop circuit.

3. A noise reducing system as claimed in claim 2 in which the video signal derived from the first loop circuit is derived from an output terminal of the first adding circuit, and the video signal derived from the second loop circuit is derived from an output terminal of the second adding circuit.

4. A noise reducing system for a video signal, said noise reducing system comprising:

vertical pre-emphasis means supplied with an input video signal which is to be transmitted, for supplying an output signal to a transmission system, said vertical pre-emphasis means having a characteristic for relatively emphasizing the level of high-frequency components of the input video signal having spatial frequencies, the emphasis being in a vertical direction of a picture compared to low-frequency components of the input video signal, said vertical pre-emphasis means comprising first and second adding circuits supplied with said input video signal, a first delay circuit for delaying an output signal of said first adding circuit by a predetermined delay time $\tau$, a first coefficient multiplying circuit for multiplying a first coefficient $K_1$ by an output signal of said first delay circuit and for supplying an output signal to said first adding circuit, and a second coefficient multiplying circuit for multiplying a second coefficient $K_2$ by the signal which is delayed in said first delay circuit and for supplying an output signal to said second adding circuit, the output of said vertical pre-emphasis means being obtained from said second adding circuit; and vertical de-emphasis means supplied with the video signal which has been pre-emphasized in said vertical pre-emphasis means and which has been transmitted through the transmission system, said vertical de-emphasis means having a characteristic for relatively attenuating the level of the high-frequency components of the pre-emphasized video signal having spatial frequencies in the vertical direction of the picture compared to the low-frequency components of the pre-emphasized video signal, said vertical de-emphasis circuit comprising third and fourth adding circuits supplied with the video signal obtained through the transmission system, a second delay circuit for delaying an output signal of said third adding circuit by the same predetermined delay time $\tau$ of said first delay circuit, a third coefficient multiplying circuit for multiplying a third coefficient $L_1$ by an output signal of said second delay circuit and for supplying an output signal to said third adding circuit, and a fourth coefficient multiplying circuit for multiplying a fourth coefficient $L_2$ by the signal which is delayed in said second delay circuit and for supplying an output signal to said fourth adding circuit, the output of said vertical de-emphasis means being obtained from said fourth adding circuit, the characteristics of said vertical pre-emphasis means and said vertical de-emphasis means cooperating so as to reduce noise having high spatial frequencies in the vertical direction of the picture.

5. A noise reducing system as claimed in claim 4 in which said second coefficient multiplying circuit is coupled to an output side of said first delay circuit, and said fourth coefficient multiplying circuit is coupled to an output side of said second delay circuit.

6. A noise reducing system as claimed in claim 4 in which said delay times $\tau$ of said first and second delay circuits are respectively equal to a duration of one horizontal scanning period of the video signal.

7. A noise reducing system as claimed in claim 4 in which said delay times $\tau$ of said first and second delay circuits are respectively equal to a duration which differs from a duration of one horizontal scanning period of the video signal by a time $\Delta t$.

8. A noise reducing system as claimed in claim 7 in which said time $\Delta t$ is selected to a value in the range of 180 nsec.

9. A noise reducing system as claimed in claim 4 in which said vertical pre-emphasis means further comprises a first lowpass filter coupled to said first delay circuit, and said vertical de-emphasis means further comprises a second lowpass filter coupled to said second delay circuit.

* * * * *